US012495982B2

(12) United States Patent
Yakishyn et al.

(10) Patent No.: US 12,495,982 B2
(45) Date of Patent: Dec. 16, 2025

(54) ELECTRONIC DEVICE FOR CONTROLLING OPERATION BASED ON A BIO-SIGNAL AND OPERATING METHOD THEREOF

(71) Applicant: Samsung Electronics Co., Ltd., Suwon-si (KR)

(72) Inventors: Yevhenii Yakishyn, Kyiv (UA); Mykhailo Zlotnyk, Kyiv (UA); Oleksandr Shchur, Kyiv (UA)

(73) Assignee: Samsung Electronics Co., Ltd., Suwon-si (KR)

( * ) Notice: Subject to any disclaimer, the term of this patent is extended or adjusted under 35 U.S.C. 154(b) by 368 days.

(21) Appl. No.: 18/178,097

(22) Filed: Mar. 3, 2023

(65) Prior Publication Data

US 2023/0284920 A1  Sep. 14, 2023

Related U.S. Application Data

(63) Continuation of application No. PCT/KR2023/002881, filed on Mar. 2, 2023.

(30) Foreign Application Priority Data

Mar. 14, 2022  (KR) ........................ 10-2022-0031587

(51) Int. Cl.
*A61B 5/024*  (2006.01)

(52) U.S. Cl.
CPC .............................. *A61B 5/02416* (2013.01); *G06T 2207/10016* (2013.01); *G06T 2207/30196* (2013.01)

(58) Field of Classification Search
None
See application file for complete search history.

(56) References Cited

U.S. PATENT DOCUMENTS

| 9,717,987 B2 * | 8/2017 | Sugawara | ............ A61B 5/1171 |
| 10,322,728 B1 * | 6/2019 | Porikli | ................... G06V 10/80 |

(Continued)

FOREIGN PATENT DOCUMENTS

| CN | 103040452 A | 4/2013 |
| CN | 111797735 A | 10/2020 |

(Continued)

OTHER PUBLICATIONS

Translation of KR 20150065529, IDS document dated Sep. 22, 2023 (Year: 2015).*

(Continued)

*Primary Examiner* — Vikkram Bali
(74) *Attorney, Agent, or Firm* — Jefferson IP Law, LLP

(57) ABSTRACT

An electronic device is provided. The electronic device includes a camera, and at least one processor, wherein the at least one processor is configured to extract at least one face region and at least one hand region from an image captured by the camera, to acquire a biosignal from each of the extracted at least one face region and hand region, to match the face region and the hand region in the image using the acquired biosignals, to identify a user by performing face recognition on the image while acquiring the biosignal, and to identify a command for controlling an operation of the electronic device based on the biosignal in the hand region matching the face region for the identified user.

18 Claims, 15 Drawing Sheets

(56) References Cited

U.S. PATENT DOCUMENTS

| | | | |
|---|---|---|---|
| 12,211,314 B2* | 1/2025 | Jia | G06V 40/16 |
| 2013/0096439 A1 | 4/2013 | Lee et al. | |
| 2016/0182506 A1 | 6/2016 | Hoyos et al. | |
| 2018/0042486 A1 | 2/2018 | Yoshizawa et al. | |
| 2018/0085010 A1 | 3/2018 | Jones et al. | |
| 2019/0038151 A1* | 2/2019 | Lee | G06T 7/0016 |
| 2019/0087555 A1 | 3/2019 | Lee et al. | |
| 2021/0132699 A1 | 5/2021 | Park et al. | |
| 2021/0279314 A1 | 9/2021 | Rodriguez Bravo et al. | |

FOREIGN PATENT DOCUMENTS

| | | |
|---|---|---|
| JP | 2016-193021 A | 11/2016 |
| KR | 10-2010-0032699 A | 3/2010 |
| KR | 10-2015-0065529 A | 6/2015 |
| KR | 10-2016-0006772 A | 1/2016 |
| KR | 10-1882281 B1 | 8/2018 |
| KR | 10-2021-0052874 A | 5/2021 |
| KR | 10-2021-0062535 A | 5/2021 |
| WO | 2015/076828 A1 | 5/2015 |

OTHER PUBLICATIONS

Extended European Search Report dated Jun. 20, 2024, issued in European Patent Application No. 23771004.1.

International Search Report and Written Opinion dated May 26, 2023, issued in International Patent Application No. PCT/KR2023/002881.

Radim Spetlik et al., Visual Heart Rate Estimation with Convolutional Neural Network, 2018.

* cited by examiner

ELECTRONIC DEVICE FOR CONTROLLING OPERATION BASED ON A BIO-SIGNAL AND OPERATING METHOD THEREOF

CROSS-REFERENCE TO RELATED APPLICATION(S)

This application is a continuation application, claiming priority under § 365(c), of an International application No. PCT/KR2023/002881, filed on Mar. 2, 2023, which is based on and claims the benefit of a Korean patent application number 10-2022-0031587, filed on Mar. 14, 2022, in the Korean Intellectual Property Office, the disclosure of which is incorporated by reference herein in its entirety.

TECHNICAL FIELD

The disclosure relates to an electronic device for controlling a biosignal-based operation and an operation method thereof. More particularly, the disclosure relates to an electronic device for controlling a biosignal-based operation and an operation method thereof, which enable management of an access right for controlling the operation of the electronic device by a user using a multimodal interface.

BACKGROUND ART

As electronic devices, such as smartphones become increasingly high-performance, various services using electronic devices are being provided. In addition to the traditional input method using a keyboard, various input methods, such as voice input may be supported. For example, the electronic device may recognize the user's voice while a voice recognition service is executed, and may execute an operation corresponding to the voice input or provide a search result. In addition, as artificial intelligence devices equipped with displays and cameras evolve into multimodal devices capable of performing various input/output operations as well as voice input/output, services that provide improved user experiences and new user experiences are emerging.

For example, a multimodal interface may refer to a method of performing interfacing using input/output, such as voice, keyboard, or pen for human-machine communication. Therefore, the multimodal interface through cameras and various sensors are expected to provide flexible and active services.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

Meanwhile, the users of the electronic devices can use various services, but at the same time, various privacy and security issues are emerging. In addition, as the functions of the electronic devices are diversified, the importance of user authentication for enhancing security is increasing. Various methods may be used for user authentication, and biometrics is an example of security authentication and is a technology for performing user authentication using unique physical characteristics, such as a user's fingerprint, face, and blood vessels. In the field of technology using such biometrics, the risk of theft or imitation is low, and ease of use thereof is high.

For example, when multimodal information is input through the multimodal interface, the electronic device may use a method of fusion and analyzing information input in each modality. When using such a multimodal interface, there is a need to identify users to provide secure access to the electronic device.

Aspects of the disclosure are to address at least the above-mentioned problems and/or disadvantages and to provide at least the advantages described below. Accordingly, an aspect of the disclosure is to provide an electronic device for controlling a biosignal-based operation and an operation method thereof, which enable management of an access right for controlling the operation of the electronic device by a user using a multimodal interface.

The technical problems to be achieved in the disclosure are not limited to the technical problems mentioned above, and other technical problems not mentioned can be clearly understood by those of ordinary skill in the art to which the disclosure belongs from the description below.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a camera and at least one processor, wherein the at least one processor may be configured to extract at least one face region and at least one hand region from an image captured by the camera, to acquire a biosignal from each of the extracted at least one face region and hand region, to match the face region and the hand region in the image using the acquired biosignals, to identify a user by performing face recognition on the image while acquiring the biosignal, and to identify a command for controlling an operation of the electronic device based on the biosignal in the hand region matching the face region for the identified user.

In accordance with another aspect of the disclosure, a method for controlling a biosignal-based operation in an electronic device is provided. The method includes extracting at least one face region and at least one hand region from an image captured by a camera, acquiring a bio signal from each of the extracted at least one face region and hand region, matching the face region and the hand region in the image using the acquired biosignals, identifying a user by performing face recognition on the image while acquiring the biosignal, and identifying a command for controlling the operation of the electronic device based on the biosignal in the hand region matching the face region of the identified user.

Advantageous Effects

According to various embodiments of the disclosure, it is possible to provide an access right to an electronic device for controlling the operation of the electronic device by a user using a multimodal interface, thereby providing secure access to the electronic device.

According to various embodiments of the disclosure, it is possible to identify (or authenticate) a user by recognizing a biosignal related to a user in a captured image so that the operation of the electronic device may be controlled only by the identified user, thereby providing enhanced secure access to the electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numerals are used to depict the same or similar elements, features, and structures.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
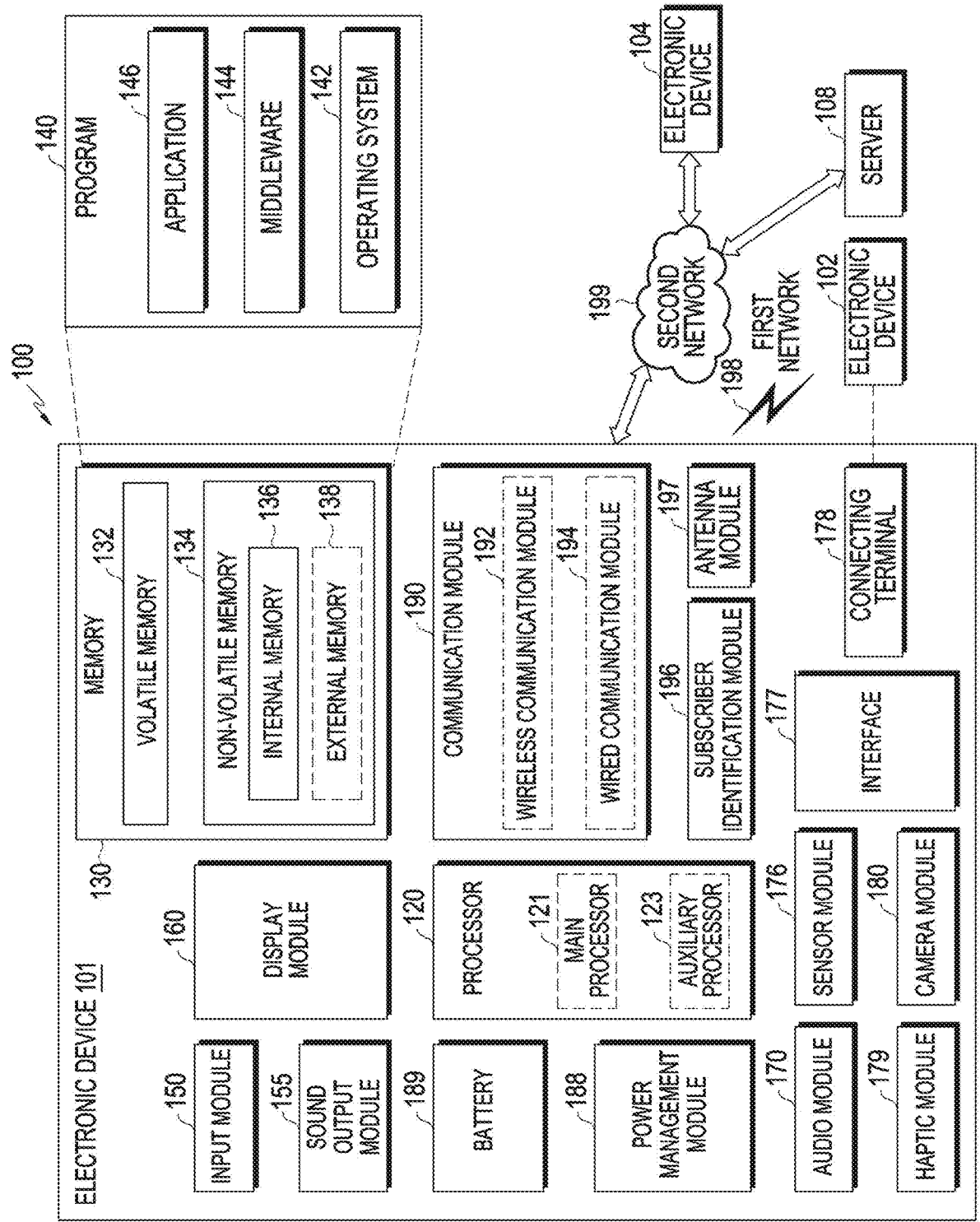
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or an external electronic device (e.g., the external electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5$^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 gigabits per second (Gbps) or more) for implementing eMBB, loss coverage (e.g., 164 database (dB) or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
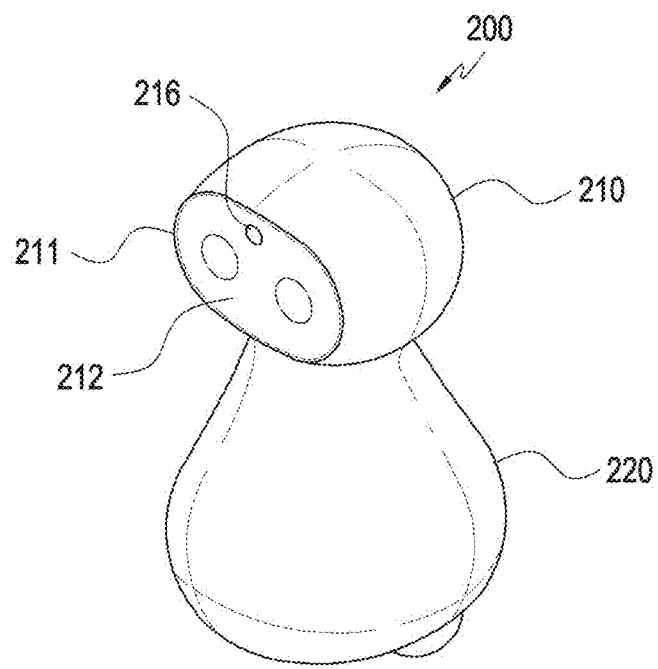
FIG. 2 is a perspective view illustrating an electronic device according to an embodiment of the disclosure.

FIG. 2 is a perspective view illustrating an electronic device according to an embodiment of the disclosure.

Referring to FIG. 2, an electronic device 200 (e.g., the electronic device 101 of FIG. 1) may be implemented in the form of a robot. The electronic device 200 may include a head unit 210 and a body unit 220. The head unit 210 may be disposed above the body unit 220. The head unit 210 and the body unit 220 may be implemented in shapes corresponding to the head and body of a person in an embodiment. According to various embodiments of the disclosure, at least some of the head unit 210 and the body unit 220 may include a front cover 211, a display 212, and a camera 216.

Referring to FIG. 2, the front cover 211 may be disposed at a position corresponding to the shape of a person's face, and may be made of a transparent material or a translucent material. The front cover 211 may be an element capable of displaying an arbitrary screen, and in this case, the front cover 211 and the display 212 may be implemented as one piece of hardware. The front cover 211 is a place indicating a direction of interaction with the user, and may be at least one or more various sensors for image sensing, a mechanical eye structure, or a display for screen output. The front cover 211 may be displayed through a light or a temporary device change in a form in which direction is not distinguished, and may include at least one H/W or device structure directed toward the user when interacting with the user.

The display 212 may be disposed inside the front cover 211 to correspond to the front cover 211. The display 212 may include a touch screen, and may receive a touch, gesture, proximity, or hovering input using, for example, an electronic pen or a portion of the user's body.

The camera 216 may capture an external environment. The electronic device 200 may identify a user or another electronic device using at least one image acquired through the camera 216. According to an embodiment of the disclosure, the electronic device 200 may detect a portion of the user's body and recognize the detected body based on the at least one image acquired through the camera 216. For example, the electronic device 200 may detect a body, such as a user's face and hand, and may identify a user of the detected face and hand. According to an embodiment of the disclosure, the electronic device 200 may identify the position or movement of at least one user or the relative position or movement of other electronic devices. According to various embodiments of the disclosure, the camera 216 may perform face tracking of capturing the user's face while tracking the same. In addition, the camera 216 may perform tracking by tracking the user's hand to identify not only the face but also the user's gesture.

According to various embodiments of the disclosure, the electronic device 200 may further include at least some of the components of FIG. 1 in addition to the above components. For example, the electronic device 200 may include at least one microphone for receiving a voice signal and a speaker for outputting a sound corresponding to data generated by the electronic device 200. According to various embodiments of the disclosure, at least a portion of the head unit 210 and the body unit 220 may further include a sensor, a communication interface, a memory, and a processor in addition to the microphone and the speaker.

According to various embodiments of the disclosure, the fact that the electronic device 200 is implemented in the form of a robot is merely exemplary, and there is no limitation in the form of implementation. For example, the electronic device 200 may be implemented as a standalone type that is formed as a single robot object. The electronic device 200 may be implemented as a docking station type for fixing a tablet PC or a smart phone. In addition, the electronic device 200 may be classified into a fixed/movable type according to whether the electronic device 200 is mobile.

Figure 3:
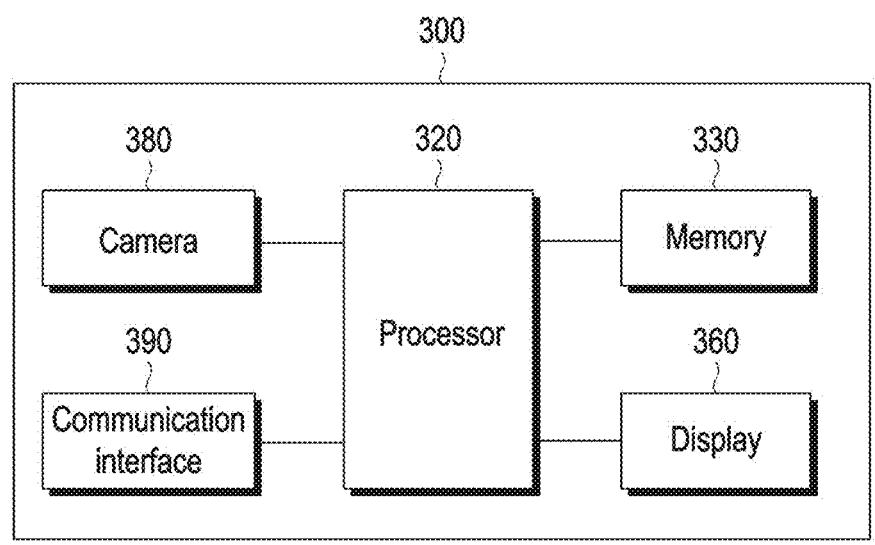
FIG. 3 is a block diagram illustrating an electronic device according to an embodiment of the disclosure.

FIG. 3 is a block diagram illustrating an electronic device according to an embodiment of the disclosure.

Referring to FIG. 3, an electronic device 300 (e.g., the electronic device 101 of FIG. 1 and the electronic device 200 of FIG. 2) according to various embodiments may include a processor 320 (e.g., the processor 120 of FIG. 1), a memory 330 (e.g., the memory 130 of FIG. 1), a display 360 (e.g., the display module 160 of FIG. 1), a camera 380 (e.g., the camera module 180 of FIG. 1), and a communication interface 390 (e.g., the communication module 190 of FIG. 1). Here, not all the components shown in FIG. 3 are essential components of the electronic device 300, and the electronic device 300 may be implemented with more or fewer components than those shown in FIG. 3.

The memory 330 may store instructions that, when executed, control the processor 320 to perform various operations. The memory 330 may store a control program for controlling the electronic device 300, UIs related to applications provided by a manufacturer or downloaded from the outside and images for providing UI, user information, documents, databases, or the related data.

According to an embodiment of the disclosure, the memory 330 may store an algorithm or data required to detect or recognize at least one user in an image (or image frame) input through the camera 380.

According to an embodiment of the disclosure, the memory 330 may store information about a user who has an access right to a multimodal command. Here, the information about the user may include identification information of a user who is authorized to access the electronic device 300. For example, the user's identification information may include user biometric information using unique physical characteristics, such as the user's face and hands. For example, user identification is possible by using biometric information on the user's face and user's hand for user identification. However, even when only the biometric information on any one of the face and the hand is obtained, the memory 330 may store (or register) the biometric information of the user in advance so that the user can be identified.

According to an embodiment of the disclosure, the memory 330 may store a plurality of predefined actions for controlling the operation of the electronic device 300. According to an embodiment of the disclosure, the user may input a voice (or a voice command) for executing a predefined function of the electronic device 300 through at least one microphone.

According to an embodiment of the disclosure, the user may perform a specific operation (or gesture) other than the voice to execute the predefined function of the electronic device 300, and a reference signal pattern of a biosignal generated by the user's gesture may be registered through a separate registration process. Here, there may be one or a plurality of predefined actions according to the number of the registered user gestures. According to an embodiment of the disclosure, the registration process of the reference signal pattern may include a process of determining a function type of the electronic device 300 that the user wants to control and registering the user's signal pattern corresponding to the determined function type.

According to an embodiment of the disclosure, the memory 330 may store information necessary for recognizing a user's voice or a user's gesture. For example, the memory 330 may recognize a user gesture in response to a biosignal pattern from an image acquired through the camera 380, and may store information necessary to process the recognized user gesture as a multimodal command.

The display 360 may include a touch screen, and may display a variety of display data generated by the processor 320 on the screen.

The camera 380 may capture an external environment. The camera 380 may provide the captured image (or image frame) to the processor 320. According to an embodiment of the disclosure, the captured image may include a moving picture.

The communication interface 390 may receive a variety of data from a transmission device (e.g., the external electronic device 102, the external electronic device 104, or the server 108 of FIG. 1), and may transmit data generated by the electronic device 300 to a reception device (e.g., the external electronic device 102, the external electronic device 104, or the server 108 of FIG. 1).

The processor 320 may acquire a captured image (e.g., a video) through the camera 380. For example, the processor 320 may sequentially acquire a plurality of image frames through the camera 380.

According to various embodiments of the disclosure, the processor 320 may acquire a biosignal of at least one user from the captured image. According to an embodiment of the disclosure, the processor 320 may configure regions of interests (ROIs) for detecting a face and a hand in the captured image, and may detect the face and the hand within the ROIs (e.g., a face region and a hand region).

According to an embodiment of the disclosure, the processor 320 may receive an image obtained by capturing the user's hand together with a user's reference body portion, e.g., the user's face, through the camera 380. In addition, when there is a plurality of users, the processor 320 may capture a plurality of faces and hands through the camera 380.

The processor 320 may extract a biosignal (e.g., a photoplethysmography (PPG) signal) from the captured image using a non-contact photoplethysmography (or non-contact photoplethysmography) (e.g., remote photo-plethysmography (rPPG)) method for the ROI. Accordingly, the processor 320 may acquire bio-signals from each of the at least one face region and the hand region. The processor 320 may match the face region and the hand region as a pair in the captured image using the acquired bio-signals. For example, when a plurality of face and hand regions are detected in an environment where multiple users exist, the face and hand for the same user may be matched as a pair based on the biosignals in each region.

According to an embodiment of the disclosure, the processor 320 may obtain a result of matching a pair of the face and the hand by comparing a correlation relationship between the biosignal for the face region and the biosignal for the hand region. For example, the processor 320 may compare a pattern of the biosignal in the face region with a pattern of the biosignal in the hand region, and may match a pair of the face region and the hand region based on the comparison result. In the case of the same user, the outputs of the biosignal in the face region and the biosignal in the hand region may have similar characteristics. Accordingly, when the pattern of the bio signal in the face region and the pattern of the biosignal in the hand region are similar within a threshold range, the processor 320 may match the face region and the hand region as a pair.

According to an embodiment of the disclosure, the processor 320 may identify a lip region within the face region, and may identify a speaking user in the captured image based on the biosignal in the lip region. In addition, the processor 320 may identify a gesture of the speaking user and perform an operation designated in association with the speaking user's gesture among operations designated for each gesture. The user's gesture may be, for example, a hand gesture, such as raising a palm or pointing a finger.

Even in the environment where two or more users exist as described above, it is possible to match a face region and a hand region having the same signal pattern, and it can be used as a multimodal command for synchronizing the user's speech and gesture using a pair of the face and the hand. For example, when the user simultaneously performs a voice command and a gesture, the processor 320 may determine a multimodal command corresponding to the voice command and the gesture, and may process a signal for performing a function of the electronic device 300 instructed by the multimodal command.

In addition, as the processor 320 performs machine learning and analysis of biosignals using a pre-stored artificial intelligence algorithm, a result of measuring and analyzing the current state of the user based on the biosignals in various environments may be reflected in movement control of the electronic device 300. Accordingly, when the electronic device 300 performs a corresponding operation in response to the multimodal command, it may be possible to support a service corresponding to the user's current state.

According to an embodiment of the disclosure, a change in the biosignal that appears when the user performs a specific action (or gesture) may be output from the hand region. For example, the change in the biosignal may be used to recognize a user's motion. Accordingly, when the user is identified (or authenticated) through face recognition after the face matching the hand used to recognize the user's motion is found, the operation of the electronic device 300 may be controlled by the identified user's hand. The processor 320 may identify the user's motion (or gesture) in the captured image based on the biosignal in the hand region, and may identify a command for controlling the operation of the electronic device 300 corresponding to the user's motion. Accordingly, the electronic device 300 may be accessed by the authenticated user based on the biosignal for the pair of face and hand.

According to an embodiment of the disclosure, the processor 320 may detect the user's face from the captured image (or an image frame) based on a face recognition method, and may recognize the detected face. According to an embodiment of the disclosure, the processor 320 may detect the face based on at least one image acquired through the camera 380 and perform face tracking, and may perform face recognition while performing face tracking. For example, face recognition may identify the user of the detected face. For example, the processor 320 may identify the user of the detected face using at least one piece of user face data stored in the memory 330.

As described above, since user identification (or user authentication) is possible through face recognition, the biosignal in the hand region matching the face region for the identified user may also be considered to be authenticated. For example, the biosignal of the user-authenticated face region may be signed with user information identified through face recognition. Alternatively, a digital signature may be generated after user identification through face recognition, and the generated digital signature may be used to sign a face-related biosignal. As described above, in the environment where two or more users exist, the face and the hand for each user may be matched in the captured image through analysis of the biosignal, so that speech (or lip movement) and hand (or gesture) may be associated with each other, thereby controlling the operation of the electronic device 300 through the gesture by the speaking user among users.

According to various embodiments of the disclosure, an electronic device 300 may include a camera 380 and at least one processor 320, wherein the at least one processor 320 may be configured to extract at least one face region and at least one hand region from an image captured by the camera 380, to acquire a biosignal from each of the extracted at least one face region and hand region, to match the face region and the hand region in the image using the acquired biosignals, to identify a user by performing face recognition on the image while acquiring the biosignal, and to identify a command for controlling an operation of the electronic device based on the biosignal in the hand region matching the face region for the identified user.

According to various embodiments of the disclosure, the biosignal may include a photo-plethysmography (PPG) signal obtained through a non-contact photoplethysmography method.

According to various embodiments of the disclosure, the at least one processor may be configured to compare a pattern of the biosignal in the at least one face region with a pattern of the biosignal in the at least one hand region, and to match a pair of face region and hand region among the at least one face region and the at least one hand region based on the comparison result.

According to various embodiments of the disclosure, when the pattern of the biosignal in the at least one face region and the pattern of the biosignal in the at least one hand region are similar within a threshold range, the at least one processor may be configured to match the face region and the hand region as a pair.

According to various embodiments of the disclosure, the at least one processor may be configured to identify a user gesture in the image based on the biosignal in the hand region, and to identify a command for controlling an operation of the electronic device corresponding to the user gesture.

According to various embodiments of the disclosure, the at least one processor may be configured to acquire at least one of a heart rate and oxygen saturation based on the PPG signal.

According to various embodiments of the disclosure, the at least one processor may be configured to identify the user by performing the face recognition and to associate the user identification result with the biosignal in the at least one face region.

According to various embodiments of the disclosure, the at least one processor may be configured to configure a region of interest (ROI) in an image captured by the camera, and to extract the at least one face region and at least one hand region within the ROI.

According to various embodiments of the disclosure, when capturing a plurality of users through the camera, the at least one processor may be configured to identify a lip region within the at least one face region, and to identify a speaking user in the image based on a biosignal in the lip region.

According to various embodiments of the disclosure, the at least one processor may be configured to identify a gesture of the speaking user in the image, and to perform an operation designated in association with the gesture of the speaking user among operations designated for each gesture.

Figure 4:
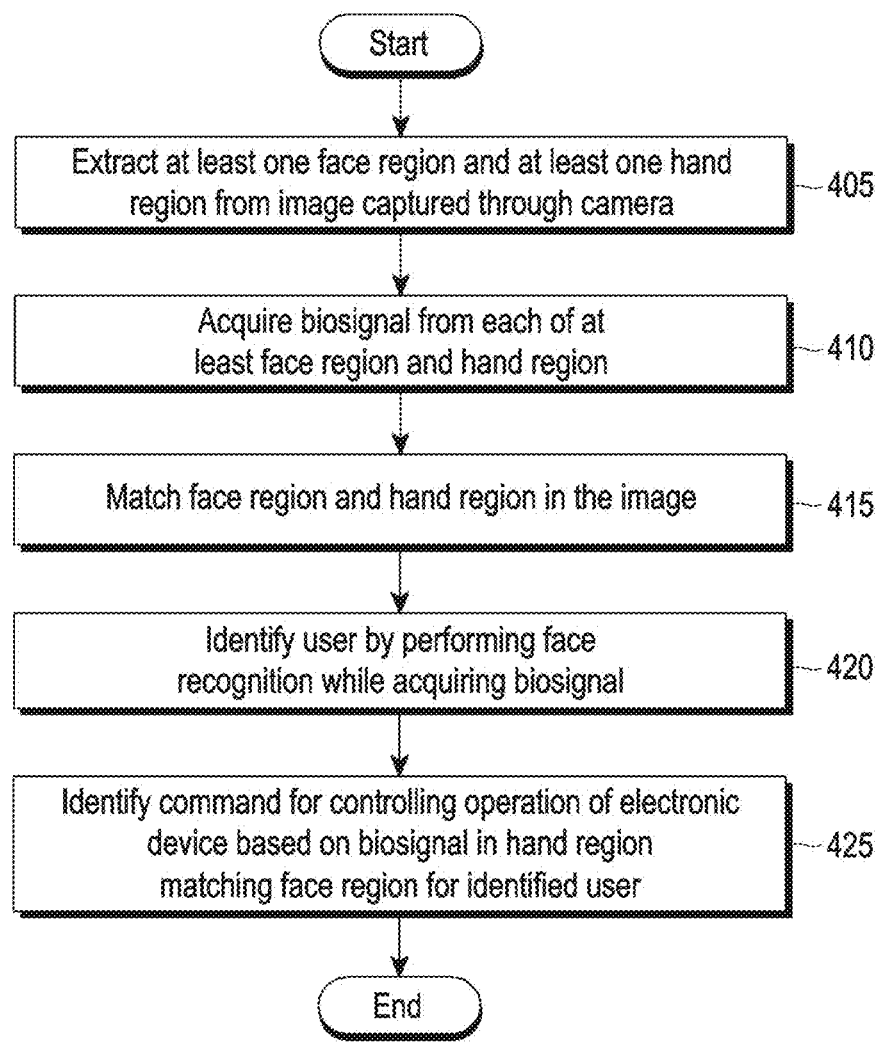
FIG. 4 is a flowchart illustrating an operation of an electronic device according to an embodiment of the disclosure.

FIG. 4 is a flowchart illustrating an operation of an electronic device according to an embodiment of the disclosure.

Referring to FIG. 4, an operating method may include operations 405 to 425. Each step/operation of the operating method of FIG. 4 may be performed by an electronic device (e.g., the electronic device 101 of FIG. 1, the electronic device 200 of FIG. 2, or the electronic device 300 of FIG. 3) or at least one processor (e.g., the processor 120 of FIG. 1 or the processor 320 of FIG. 3) of the electronic device. In an embodiment of the disclosure, at least one of operations 405 to 425 may be omitted, the order of some operations may be changed, or another operation may be added.

According to various embodiments of the disclosure, in operation 405, the electronic device 300 may extract at least one face region and at least one hand region from an image captured by the camera 380. According to an embodiment of hand region, the extracting of the at least one face region and the at least one hand region may include configuring a region of interest (ROI) in the image captured by the camera 380, and extracting the at least one face region and the at least one hand region within the ROI.

In operation 410, the electronic device 300 may acquire biosignals from each of the extracted at least one face region and hand region. According to an embodiment of the disclosure, the biosignal may include a photo-plethysmography (PPG) signal obtained through a non-contact photoplethysmography method. According to various embodiments of the disclosure, the method may further include acquiring at least one of the heart rate and the oxygen saturation based on the PPG signal. For example, the at least one of the heart rate and the oxygen saturation may be acquired based on the user's biosignals, and the acquired biometric data, such as the heart rate and the oxygen saturation may be used to determine service support corresponding to the user's current state.

In operation 415, the electronic device 300 may match the face region and the hand region in the image using the acquired biosignals. According to an embodiment of the disclosure, the matching of the face region and the hand region in the image may include comparing a pattern of the biosignal in the at least one face region with a pattern of the biosignal in the at least one hand region, and matching a pair of face region and hand region among the at least one face region and the at least one hand region based on the comparison result.

According to an embodiment of the disclosure, when the pattern of the biosignal in the at least one face region and the pattern of the biosignal in the at least one hand region are similar within a threshold range, the matching of the pair of face region and hand region may include matching the face region and the hand region as a pair.

In operation 420, the electronic device 300 may identify a user (or authenticate a user) by performing face recognition on the image while acquiring the biosignal. According to an embodiment of the disclosure, the method may further include, after the identifying of the user by performing face recognition, associating the user identification result with the biosignal in the at least one face region. For example, the electronic device 300 may identify the user in the image by performing face recognition using pre-stored face data.

In operation 425, the electronic device 300 may identify a command for controlling the operation of the electronic device based on the biosignal in the hand region matching the face region of the identified user. According to an embodiment of the disclosure, the identifying of the command for controlling the operation of the electronic device may include identifying a user gesture in the image based on the biosignal in the hand region, and identifying the command for controlling the operation of the electronic device corresponding to the user gesture.

According to various embodiments of the disclosure, the method may further include, when capturing a plurality of users through the camera, identifying a lip region in the at least one face region, and identifying a speaking user in the image based on the biosignal in the lip region.

According to various embodiments of the disclosure, the method may further include identifying a gesture of the speaking user in the image, and performing a designated operation in association with the gesture of the speaking user among operations designated for each gesture.

Figure 5A:
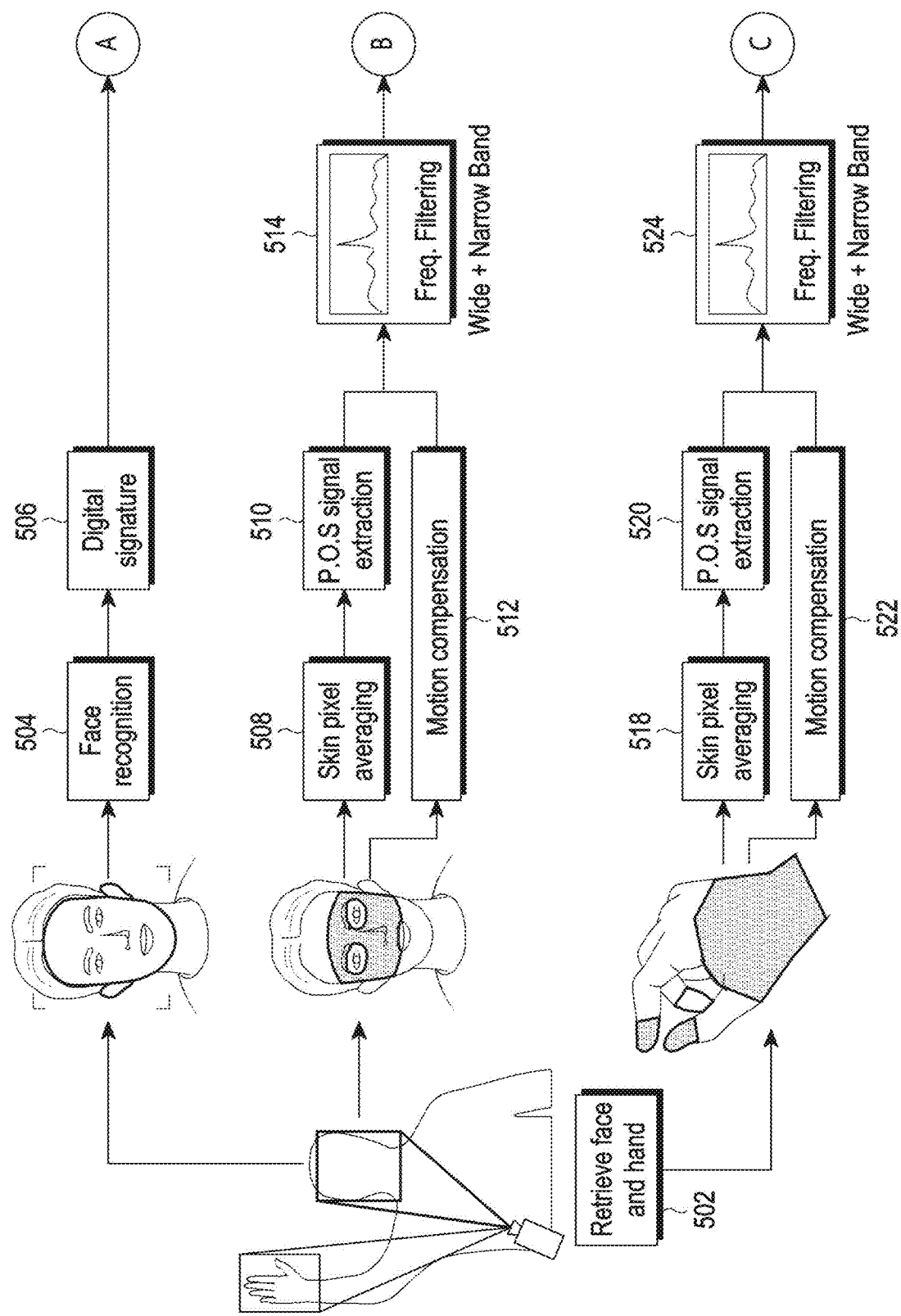
FIG. 5A is a diagram illustrating a processing method by a multimodal command through monitoring and analyzing a biosignal according to an embodiment of the disclosure.
Figure 5B:
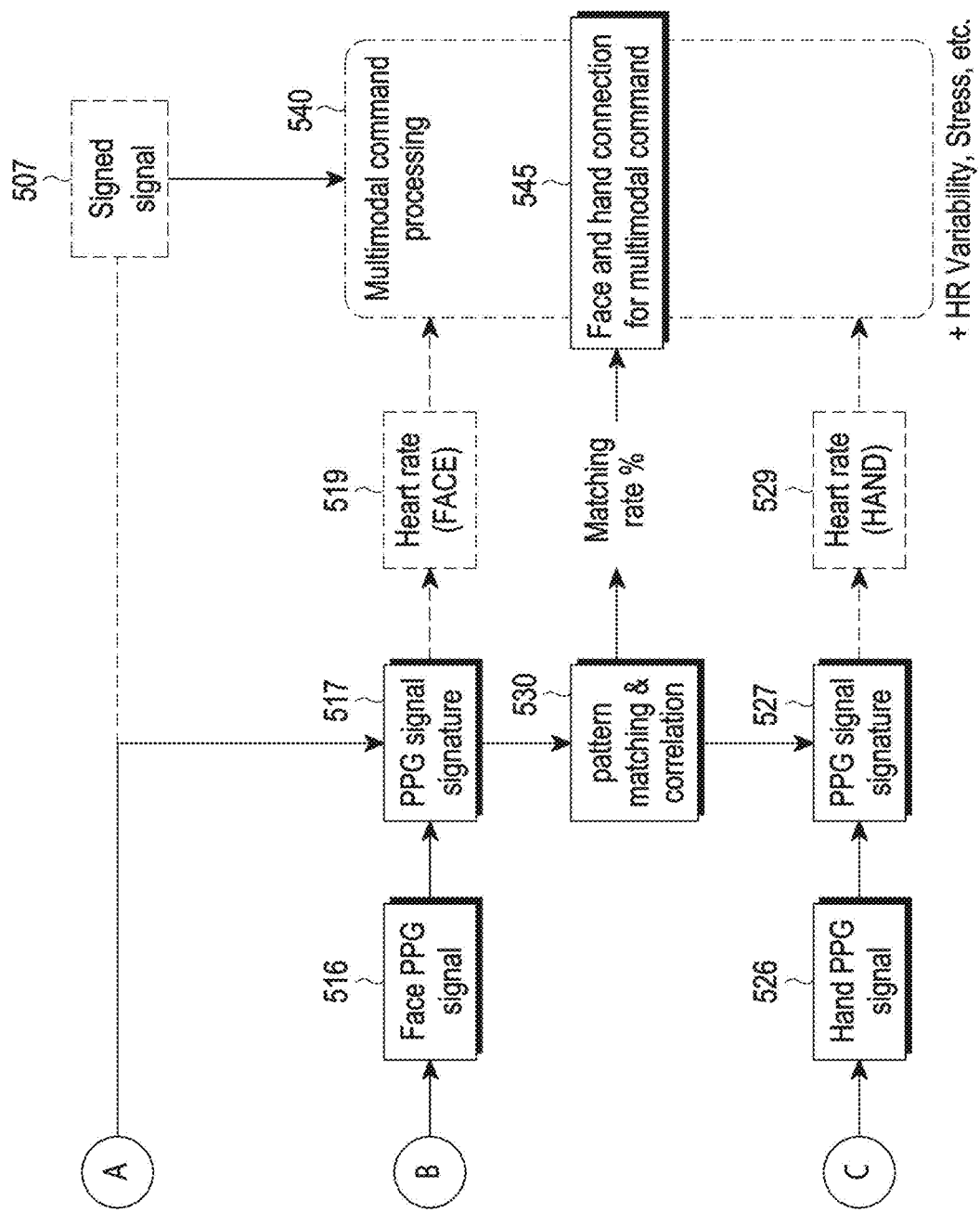
FIG. 5B is a diagram subsequent to FIG. 5A according to an embodiment of the disclosure.

FIG. 5A is a diagram illustrating a processing method by a multimodal command through monitoring and analyzing a biosignal using a camera according to an embodiment of the disclosure. FIG. 5B is a diagram subsequent to FIG. 5A according to an embodiment of the disclosure. Here, FIGS. 5A and 5B are connected diagrams, and a connection relationship in each processing operation may be represented by "A", "B", and "C".

Referring to FIGS. 5A and 5B, while at least one user performs an action (or gesture), in operation 502, the electronic device 300 may retrieve a face and a hand from an image input through the camera 380 using at least one image processing method. The electronic device 300 may configure an ROI in the input image and may retrieve the face and the hand within the ROI. For example, a region tracking algorithm (e.g., face tracking or hand tracking) may be used to configure a consistent ROI over time within one or more image frames.

According to an embodiment of the disclosure, in operation 508, the electronic device 300 may perform skin pixel averaging in the face region of the input image. For example, when the face region includes pixels, such as eyebrows having a low relation to PPG signal estimation, skin color filtering may be used to exclude the remaining regions except for a region for the PPG signal estimation. In the case of the face, about ⅔ of the face, where most of the blood vessels are concentrated, may be configured as the ROI (e.g., the face region). At this time, when estimating the PPG signal, a P.O.S signal may be extracted in operation 510 in order to exclude non-uniform light reflection on the skin surface caused by large and small movements (or motions) of the face region, and a signal waveform subjected to motion compensation may be output in operation 512. The electronic device 300 may acquire a face-related PPG signal in operation 516 from which a noise component has been removed by performing frequency filtering for filtering noise on the signal wavelength in operation 514.

Meanwhile, according to an embodiment of the disclosure, the electronic device 300 may perform skin pixel averaging in the hand region of the input image in operation 518, may extract a P.O.S signal in operation 520, and may output a signal waveform subjected to motion compensation in operation 522. The electronic device 300 may perform frequency filtering on the signal waveform in operation 524. Since the processing operation for the hand region may be the same as the processing operation for the face region described above, a detailed description of acquiring in operation 526 of the PPG signal related to the hand will be omitted.

While acquiring the face-related PPG signal and a hand-related PPG signal as described above, the electronic device 300 may identify the user's face by performing face recognition on the input image in operation 504. For example, any existing face recognition method may be used as the face recognition method, and when it is determined that a face is present in an image frame, the electronic device 300 may identify the user by determining that the identified face is the user's face. In addition, the electronic device 300 may generate a digital signature in operation 506 to associate the PPG signals with the user identified through face recognition. For example, the electronic device 300 may generate a digital signature by associating the extracted PPG signal with the user by signing the PPG signal obtained from the face with facial biometric data.

The electronic device 300 may connect the face and the hand in the input image by analyzing the PPG signal obtained through non-contact photoplethysmography (rPPG), and may sign the PPG signal with the facial biometric data for the purpose of safe fusion voice and gesture in a multimodal scenario in operations 517 and 527. In addition, by reading the PPG signal of the lip region, the electronic device 300 may identify the user based on the facial biometric data and may simultaneously sign the PPG signal.

In operation 530, the electronic device 300 may analyze a pattern matching and correlation between the PPG signals obtained from the face region and the hand region. In the case of PPG signal patterns having a high matching rate, the face and the hand may be associated with each other as a pair for the multimodal command without skeleton recognition in operation 545.

The PPG signal may be continuously extracted while tracking the face and the hand, and the command for controlling the operation of the electronic device 300 may be identified based on the pair of PPG signals when the multimodal command is processed in operation 540. In this case, the electronic device 300 may provide signed signals 507 for the purpose of processing the multimodal command in response to the user identification through face recognition in operation 540.

Meanwhile, the electronic device 300 may provide at least one piece of biometric information using the PPG signals.

For example, the electronic device 300 may acquire a heart rate 519 based on the PPG signal related to the face, and may also acquire a heart rate 529 based on the PPG signal related to the hand. As an example of the at least one piece of biometric information, a variety of biometric information other than the heart rate may be provided. For example, the variety of biometric information, such as oxygen saturation, respiration, and stress index may be reflected in executing the command for controlling the operation of the electronic device 300.

According to various embodiments of the disclosure, the electronic device 300 may match a face and a hand even when capturing a plurality of users. In addition, the electronic device 300 may identify a lip region within the face region, and may identify a speaking user among the plurality of users based on a signal characteristic of the lip region. Therefore, even when the user performs a voice command and a gesture at the same time, it is possible to identify which user is speaking and which gesture the user is making through face and hand matching, so it is also possible to identify which hand is related to the speaking user.

Figure 6A:
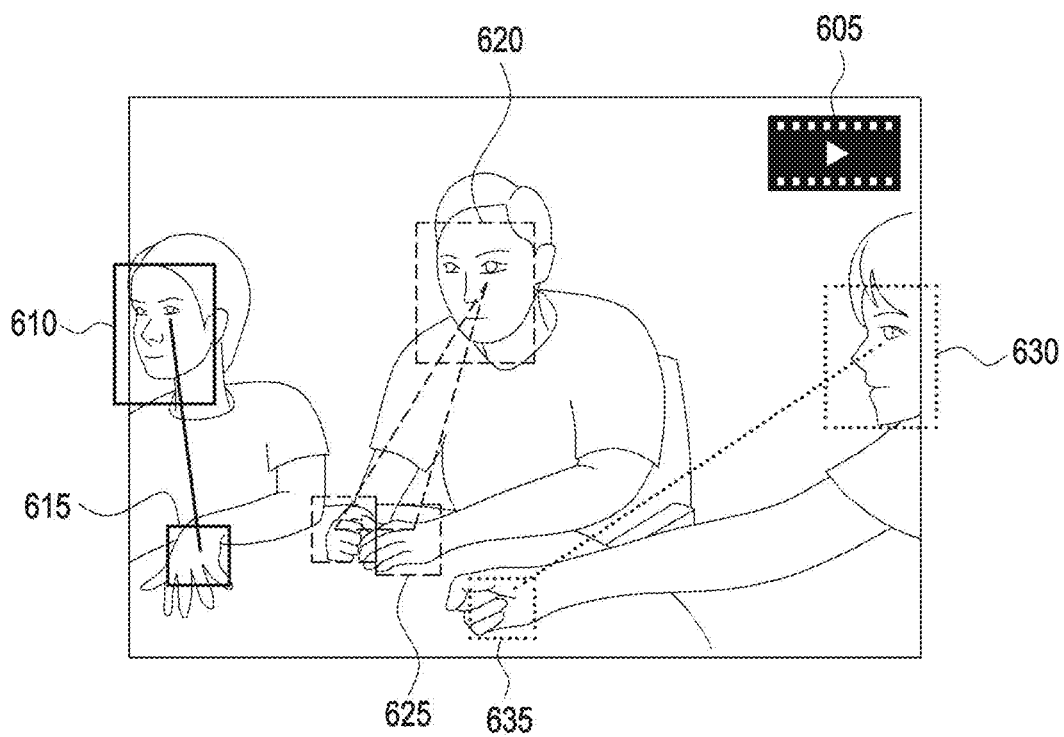
FIG. 6A is a diagram illustrating a method of identifying a user in an environment in which a plurality of users exist according to an embodiment of the disclosure.
Figure 6B:
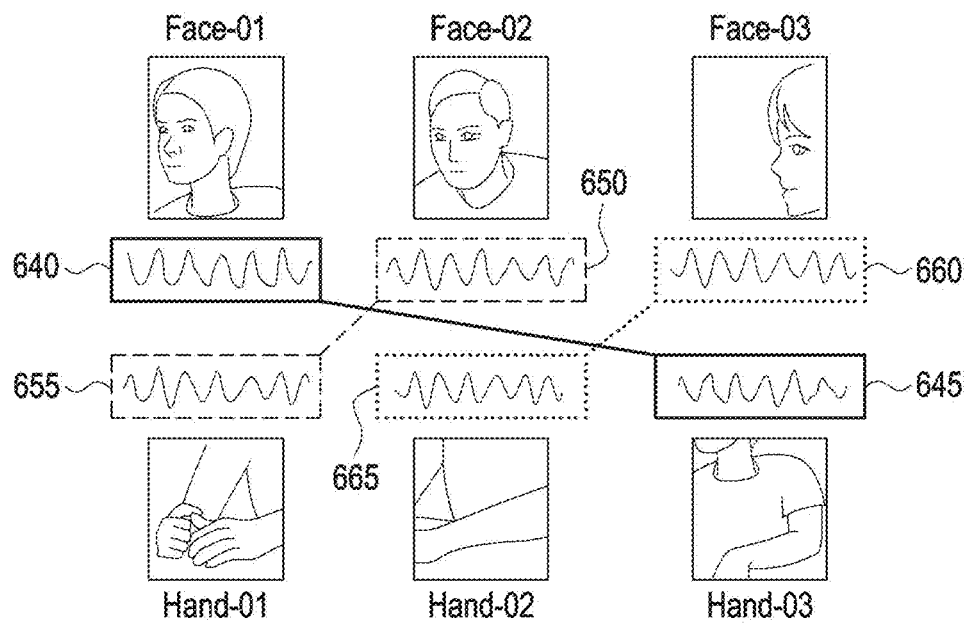
FIG. 6B is a diagram illustrating a method of identifying a user through hand and face matching in FIG. 6A according to an embodiment of the disclosure.

FIG. 6A is a diagram illustrating a method of identifying a user in an environment in which a plurality of users exist according to an embodiment of the disclosure. FIG. 6B is a diagram illustrating a method of identifying a user through hand and face matching in FIG. 6A according to an embodiment of the disclosure.

Referring to FIG. 6A, a plurality of face regions 610, 620, and 630 and hand regions 615, 625, and 635 related to the plurality of users may be extracted from an image frame input through the camera 380. Here, the image may be a moving picture 605 captured in real time. For example, hand tracking or face tracking may be performed in order to configure a consistent ROI over time within one or more image frames.

Referring to FIG. 6B, during face tracking, a first biosignal 640, a second biosignal 650, and a third biosignal 660 having different waveforms may be acquired in association with a first face region face-01, a second face region face-02, and a third face region face-03, respectively.

In addition, during hand tracking, a fourth biosignal 655, a fifth biosignal 665, and a sixth biosignal 645 having different waveforms may be acquired in association with a first hand region hand-01, a second hand region hand-02, and a third hand region hand-03, respectively.

The electronic device 300 may determine a correlation between the biosignals 640, 650, and 660 acquired from each of the face regions and the biosignals 645, 655, and 665 acquired from each of the hand regions. In the case of similar signal patterns, the face region and the hand region in the image may be connected as a pair. According to an embodiment of the disclosure, the electronic device 300 may match signals having the same comparison result within a threshold range as a pair based on the comparison result of the signal patterns. For example, since the output waveform of the first biosignal 640 is the same as the output waveform of the sixth biosignal 645, the face in the first face region may match the hand in the third hand region. In this manner, even if there are multiple users in the captured image, the face and the hand may be connected, and when user identification is performed through face recognition, the hand matching the face region related to the user for which identification has been completed is also for the same user, so that it is possible to authenticate the user taking a hand gesture. The operation of the electronic device may be controlled only for the operation (or hand gesture) of the identified user by identifying (or authenticating) the user through face recognition, thereby providing enhanced secure access to the electronic device.

Figure 7:
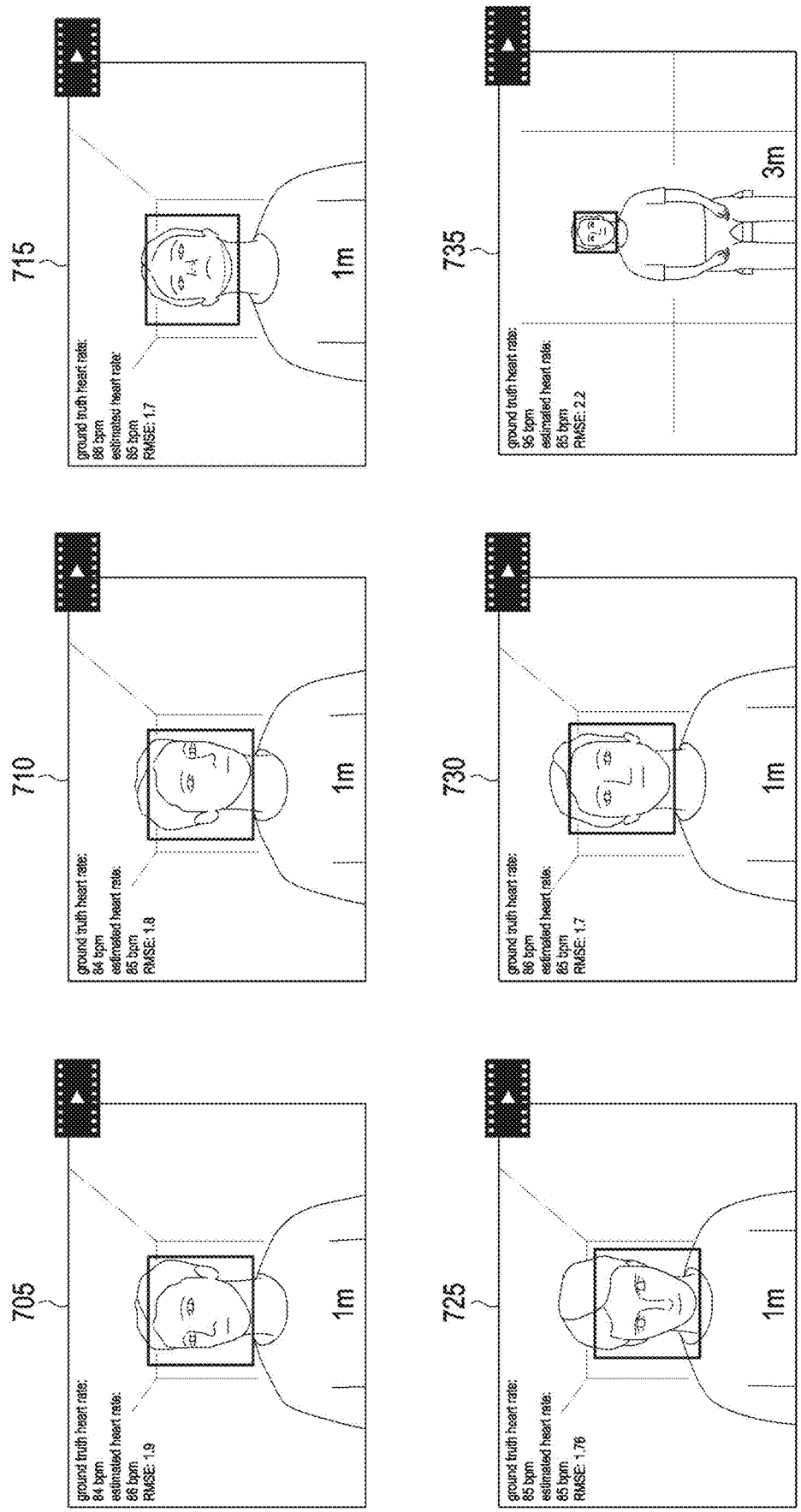
FIG. 7 is a diagram illustrating a method of extracting a remote photo-plethysmography (rPPG) signal for a face according to an embodiment of the disclosure.

FIG. 7 is a diagram illustrating a method of extracting an rPPG signal for a face according to an embodiment of the disclosure.

The electronic device 300 may determine a region of interest (ROI) for detecting user's face and hand for each frame of an image captured by the camera 380. Referring to FIG. 7, an ROI for the face is illustrated. According to an embodiment of the disclosure, in the case of the face, about ⅔ of the face, where most of the blood vessels are concentrated, may be configured as the ROI.

Respective image frames 705, 710, 715, 725, 730, and 735 in FIG. 7 illustrate at least some frames of an image captured in real time, and even when the direction of the user's face is changed, the ROI may be continuously configured on the face region. For example, in the cases in which a root mean square error (RMSE) is 0-2 bPm, a reference distance is 1 m, an initial time for obtaining an initial heart rate (HR) value is 5 seconds, and a duration for obtaining the most reliable value is 9 seconds, a biosignal in the ROI within each of the image frames 705, 710, 715, 725, 730, and 735 may be acquired. Even if the direction of the user's face is changed as in each of the image frames 705, 710, 715, 725, 730, and 735 of FIG. 7 or the reference distance is changed to 3 m as in the image frame 735, the heart rate estimated based on the actual heart rate and the biosignal may be output as a constant value without a significant change. As such, since the ROI is a region with relatively little movement by expression from the face, the ROI may be suitable for measurement of biosignals and may be located in the center of the face of a subject to be measured, so that the effect on biosignal measurement can be reduced even if the face moves within the frame.

Figure 8:
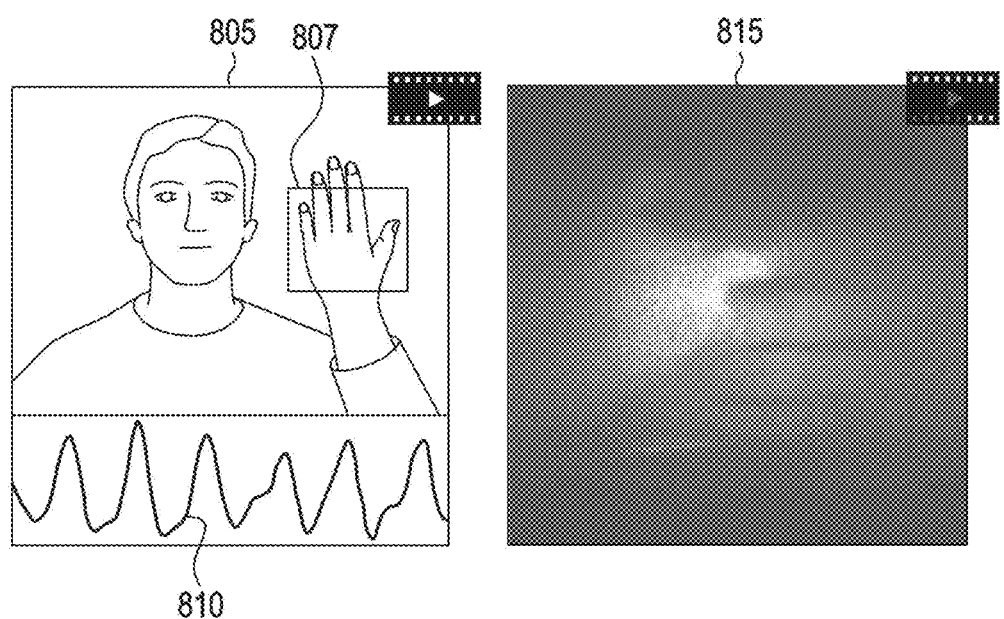
FIG. 8 is a diagram illustrating a method of extracting an rPPG signal for a hand according to an embodiment of the disclosure.

FIG. 8 is a diagram illustrating a method of extracting an rPPG signal for a hand according to an embodiment of the disclosure.

Referring to FIG. 8, the electronic device 300 may determine an ROI for detecting the user's face and hand with respect to each frame of an image 805 captured by the camera 380. In FIG. 8, an example in which an ROI 807 for the hand is determined is illustrated.

According to various embodiments of the disclosure, the electronic device 300 may detect a biosignal 810 in the ROI 807 for the hand as shown in FIG. 8. According to an embodiment of the disclosure, in the case of a hand, at least one of a wrist, a finger, or both palms, where blood vessels are concentrated, may be configured as the ROI.

For example, in an image 815 corresponding to the ROI, optical signal data having a plurality of colors may be detected. In the case of a captured image, a biosignal may be output using an electrical signal converted from light reflected from user's blood vessels. Such a biosignal may be a PPG signal. The electronic device 300 may analyze each image frame in order to acquire the biosignal of the hand. For example, a pulse wave of the user's hand may be calculated and visualized in real time from an input stream of a 16-bit and 1024×512 pixel interferogram at a rate of about 1500 frames per second (e.g., 1.5 GB/s). Temporal signal demodulation of 64 consecutive hologram stacks may be performed by principal component analysis at a rate of 250 Hz. For example, when the user takes a picture with the back of his hand facing the camera 380, a heart rate (e.g., 76 bPm) based on the biosignal of the user's hand may be displayed on the screen.

Figure 9A:
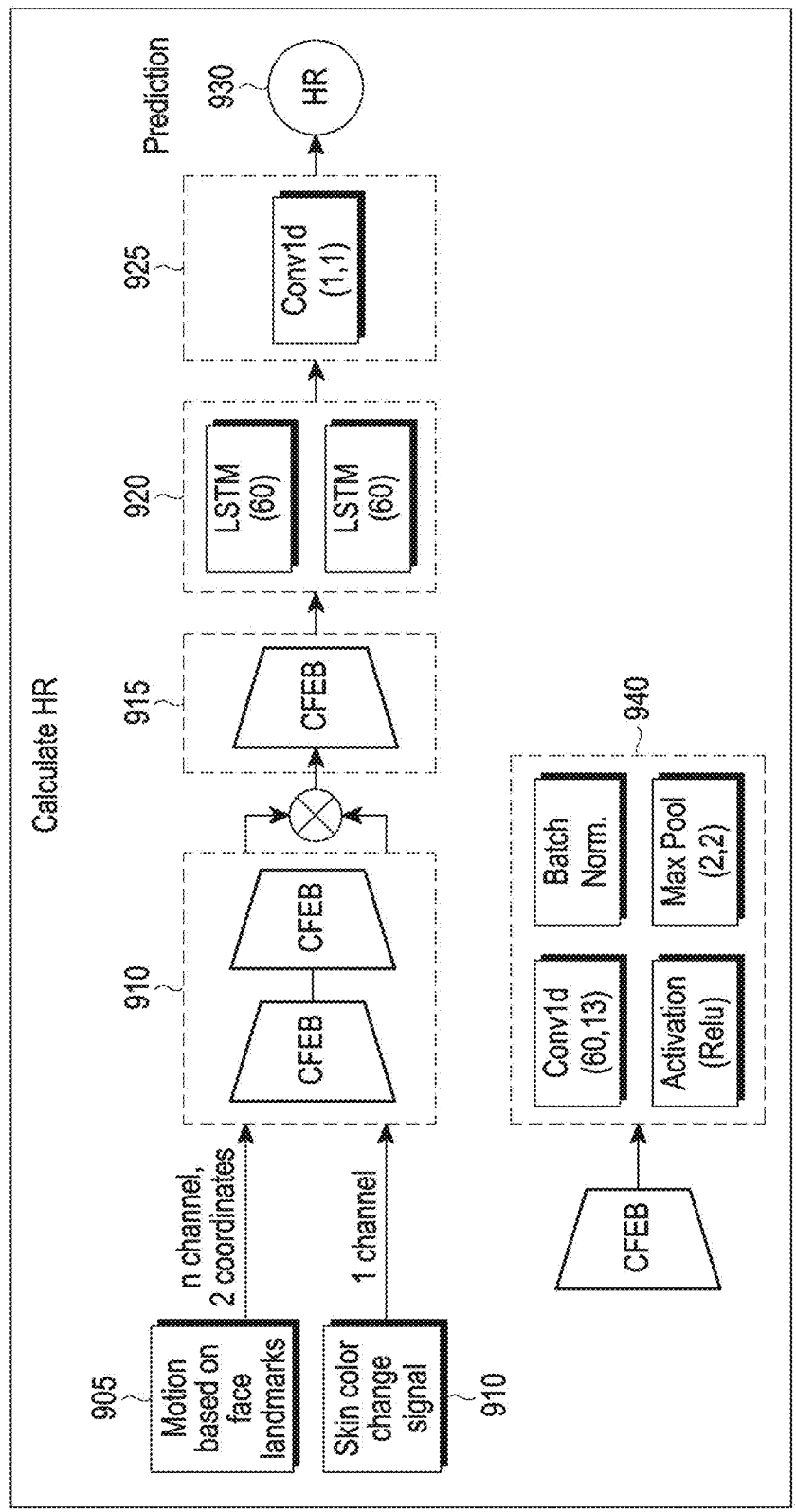
FIG. 9A is a diagram illustrating a method of calculating a heart rate (HR) according to an embodiment of the disclosure.
Figure 9B:
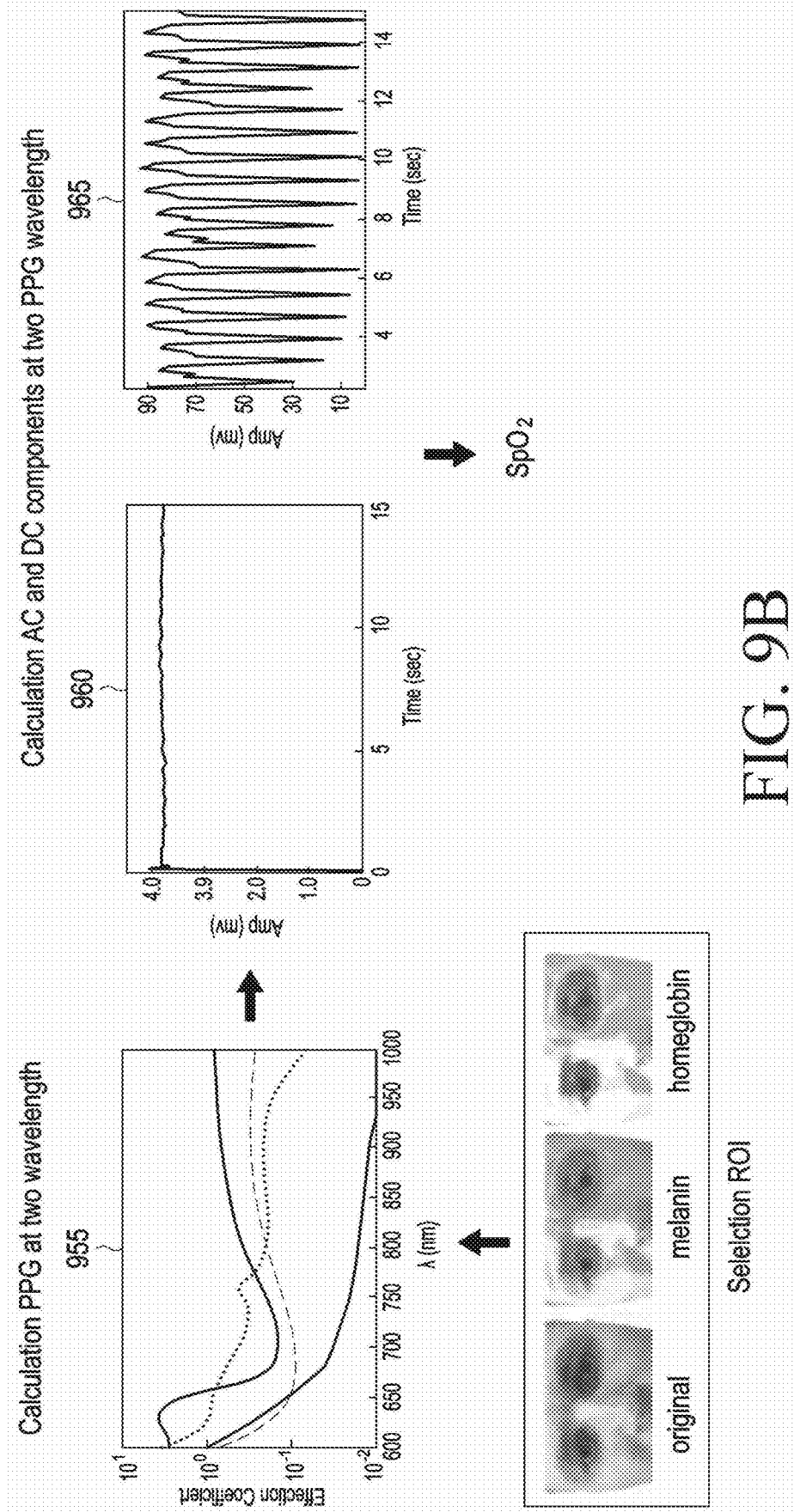
FIG. 9B is a diagram illustrating a method of calculating an oxygen saturation (SpO2) according to an embodiment of the disclosure.

According to various embodiments of the disclosure, the electronic device 300 may analyze the PPG signals while acquiring the PPG signal for each ROI in the captured image, for example, the face region and the hand region. For example, the electronic device 300 may provide at least one piece of biometric information, such as heart rate and oxygen saturation by analyzing the acquired PPG signals. A heart rate calculation method based on the PPG signal may be based on a method illustrated in FIG. 9A, and an oxygen saturation calculation method may be based on a method illustrated in FIG. 9B. FIG. 9A is a diagram illustrating a method of calculating a heart rate (HR) according to an embodiment of the disclosure. FIG. 9B is a diagram illustrating a method of calculating an oxygen saturation (SpO2) according to an embodiment of the disclosure.

When the heart rate calculation method is briefly described referring to FIG. 9A, raw sensor data 905 and 910 may be received from a convolution feature extraction block (CFEB) 910 through a camera, and the raw sensor data may include motion based on facial features and signals obtained by changing skin pixels. The CFEB 910 may extract a low level feature by raw sensor data processing. Next, the CFEB 915 may extract a high level feature through 4*d* context vector processing. A long short-term memory (LSTM) 920 may extract a temporal feature through time sequence processing. For example, the heart rate for a measurement section may be estimated by converting the heart rate into a desired time unit, and a heart rate 930 calculated through an output unit 25 may be output. For reference, various operations 940 may be performed in the CFEB, and for example, Conv1d 925 (filter number, kernel size) may mean convolution.

In addition, when the oxygen saturation calculation method is briefly described referring to FIG. 9B, ROIs in a captured image may be selected. A non-contact photoplethysmography (rPPG) method is a contrast between specular reflection and diffused reflection, and is to measure changes in light reflections of R, G, and B that are changed in the skin in the captured image (or image frame). Here, the specular reflection may refer to pure light reflection from the skin, and the diffused reflection may refer to reflection remaining due to absorption and scattering of the skin tissue that is changed depending on a change in blood volume. The electronic device 300 may acquire a PPG signal based on a signal waveform 955 for each ROI, and may calculate the oxygen saturation based on the PPG signal by calculating an alternate current (AC) component 960 and a DV component 965.

For example, the electronic device 300 may acquire at least one of the heart rate and the oxygen saturation based on the PPG signals of the user, and biometric data, such as the acquired heart rate and oxygen saturation may be used to determine service support corresponding to the current state of the user.

Figure 10A:
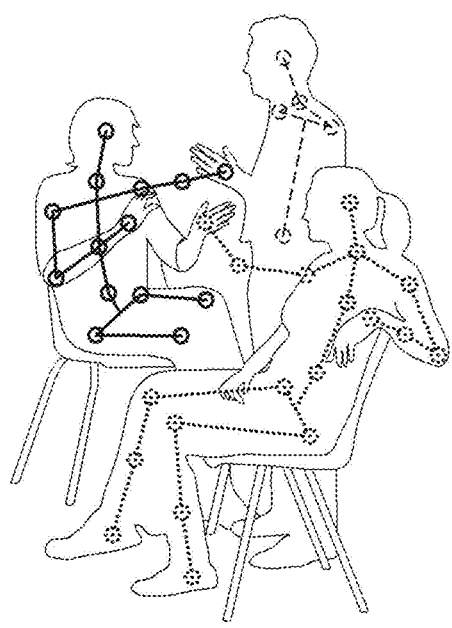
FIG. 10A is diagram illustrating a comparison between a general skeleton-based recognition method and a biosignal-based recognition method according to an embodiment of the disclosure.
Figure 10B:
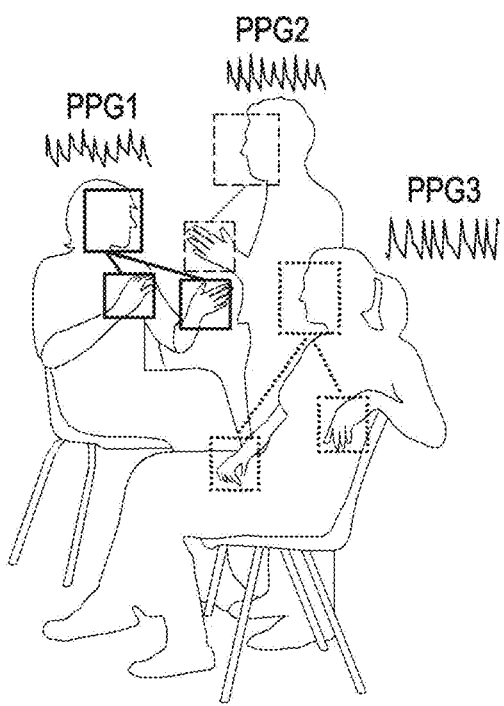
FIG. 10B is diagram illustrating a comparison between a general skeleton-based recognition method and a biosignal-based recognition method according to an embodiment of the disclosure.

FIGS. 10A and 10B are diagrams illustrating a comparison between a general skeleton-based recognition method and a biosignal-based recognition method according to an embodiment of the disclosure.

Referring to FIGS. 10A and 10B, a skeleton-based recognition method is exemplified in an environment in which a plurality of users exist. In the case of the skeleton-based recognition method, a lot of resources may be required to recognize the full skeleton and to calculate the linkage of landmarks (e.g., key points, joints) in order to connect (match) the head (or face) and the hand. On the other hand, in the case of the biosignal-based recognition method according to various embodiments of the disclosure, since it is possible to extract biosignals of the same signal pattern from the user's face and hand, body portions may be linked (or match) using such a signal pattern. Accordingly, in the healthcare field, heart rate measurement and photo-plethysmography may be performed on the user without direct contact with the user, so that it is possible to connect the face and hands of the user through the analysis of biosignals without using the skeleton recognition method. In addition, in order to control the operation of the electronic device 300, the user's speech and gesture must be synchronized. In an environment in which a plurality of users exist, it may be difficult to enable each user's speech (or lip movement) and hand (or gesture) to be linked.

According to various embodiments of the disclosure, in a multimodal command, based on the biosignal analysis result for the user obtained through rPPG from the captured image (or image frame) without recognizing the full skeleton, it is possible to connect the user's face and hand According to various embodiments of the disclosure, since only the analysis result of the face and the hand in the captured image is required, the analysis result thereof may be effective in the multimodal command, and the result of matching the user's face and hand may be used to recognize the speaking user's voice and gesture. In multimodal interaction, the skeleton-based recognition method has high complexity due to a situation in which other users and the actual user overlap, but according to various embodiments of the disclosure, it is possible to identify the speaking user and the gesture of the speaking user. In order to describe this, it will be described with reference to FIGS. 11 and 12.

Figure 11:
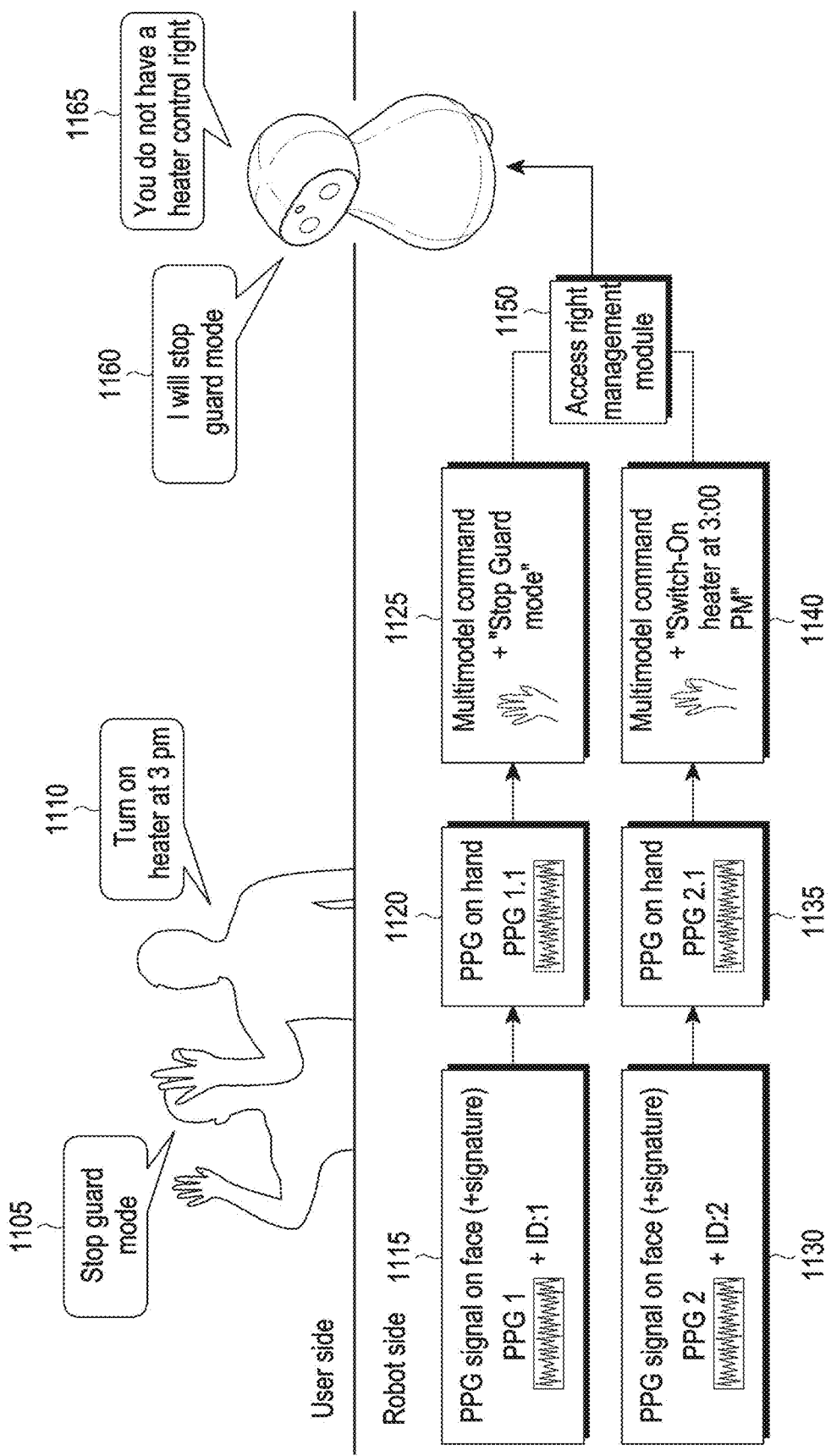
FIG. 11 is a diagram illustrating a processing result according to a multimodal input of a user having an access right according to an embodiment of the disclosure.

FIG. 11 is a diagram illustrating a processing result according to a multimodal input of a user having an access right according to an embodiment of the disclosure. FIG. 11 illustrates a case in which two users are photographed (or captured) using a camera while gestures 1105 and 1110 are performed by the two users.

Referring to FIG. 11, one or more image frames may be captured as the users perform the gestures, and an ROI, for example, a face region and a hand region, may be extracted from the one or more image frames.

Referring to FIG. 11, according to an embodiment of the disclosure, in the image obtained by capturing the two users, the electronic device 300 may acquire a first PPG signal (e.g., PPG 1) based on a signal value obtained from a first face region, and may acquire a second PPG signal (e.g., PPG 2) from a second face region. While acquiring the second PPG signal from the second face region and acquiring the first PPG signal from the first face region, the electronic device 300 may identify the user by performing face recognition for each face region.

According to an embodiment of the disclosure, the electronic device 300 may acquire identification information (e.g., ID: 1) related to a first user and identification information (e.g., ID: 2) related to a second user through face recognition. The electronic device 300 may associate the user identification result (or the user authentication result) with the PPG signal in each of the face regions. For example, the electronic device 300 may associate, with the user, the PPG signal extracted by signing the PPG signal obtained (or extracted) from the face region with facial biometric data, and may generate a digital signature.

According to an embodiment of the disclosure, the electronic device 300 may sign the first PPG signal (e.g., PPG 1) with the identification information (e.g., ID: 1) related to the first user in operation 1115, and may sign the second PPG signal (e.g., PPG 2) with the identification information (e.g., ID: 2) related to the second user in operation 1130.

In addition, the electronic device 300 may acquire a 1.1 PPG signal (e.g., PPG 1.1) from the first hand region in operation 1120, and may acquire a 2.1 PPG signal (e.g., PPG 2.1) from the second hand region in operation 1135.

According to an embodiment of the disclosure, the electronic device 300 may match a pair of face region and hand region based on the comparison result by comparing a pattern of the PPG signal in each of the face regions and a pattern of the PPG signal in each of the hand regions. For example, the electronic device 300 may compare the signal pattern of each of the first PPG signal (e.g., PPG1) for the first face region and the second PPG signal (e.g., PPG2) for the second face region with the 1.1 PPG signal (e.g., PPG 1.1) for the first hand region and the 2.1 PPG signal (e.g., PPG 2.1) for the second hand region, respectively. When the pattern of the first PPG signal (e.g., PPG 1) for the first face region and the pattern of the 1.1 PPG signal (e.g., PPG 1.1) for the first hand region are similar within a threshold range, the first face region and the first hand region may be considered to correspond to the same user, for example, the first user.

Accordingly, after matching the face and hand as a pair, the electronic device 300 may identify a multimodal command by analyzing the 1.1 PPG signal (e.g., PPG 1.1) for the first hand region and the 2.1 PPG signal (e.g., PPG 2.1) for the second hand region. For example, as a result of analyzing the 1.1 PPG signal (e.g., PPG 1.1), the electronic device 300 may identify a hand gesture, such as raising the palm intended for controlling the operation of the electronic device 300 (e.g., "Stop guard mode") in operation 1125. In addition, as a result of analyzing the 2.1 PPG signal (e.g., PPG 2.1), the electronic device 300 may identify a hand gesture, such as tong intended for controlling the operation of the electronic device 300 (e.g., "Turn on heater at 3 pm") in operation 1140. The multimodal commands 1125 and 1140 as described above may be transmitted to an access right management module 1150.

The access right management module 1150 of the electronic device 300 may determine whether the identified user can perform a gesture or a multimodal command. Here, the access authority management module 1150 may allow an access right to the user associated with the hand region and the face region when the comparison results are similar based on the comparison of the PPG signals obtained from each of the hand region and the face region. Accordingly, the access authority management module 1150 may determine the personality of the user performing the multimodal command or the gesture in the captured image by processing the PPG signal for the hand region matching the user-identified face region. Here, the personality determination may mean finding a digital signature generated during user identification after face recognition with respect to the PPG signal. For example, after user identification through face recognition, the identification information (e.g., ID: 1) related to the first user signed in the first PPG signal (e.g., PPG 1) may be extracted, and the identification information (e.g., ID: 2) related to the second user signed in the second PPG signal (e.g., PPG 2) may be extracted.

As described above, the electronic device 300 may identify the personality based on the PPG signal signature for each face region, and thus it is possible to manage the access right for executing the command. When there is identification information related to a face-recognized user in a DB managed by the access right management module 1150, the electronic device 300 may output a command execution-related content 1160 (e.g., I will stop guard mode") along with the command execution with respect to the gesture 1105 by the first user. On the other hand, when there is no identification information related to the face-recognized user in the DB managed by the access right management module 1150, the electronic device 300 may output a content (e.g., "You do not have a heater control right") 1165 for indicating that a command cannot be executed with respect to the gesture 1130 by the second user.

Figure 12:
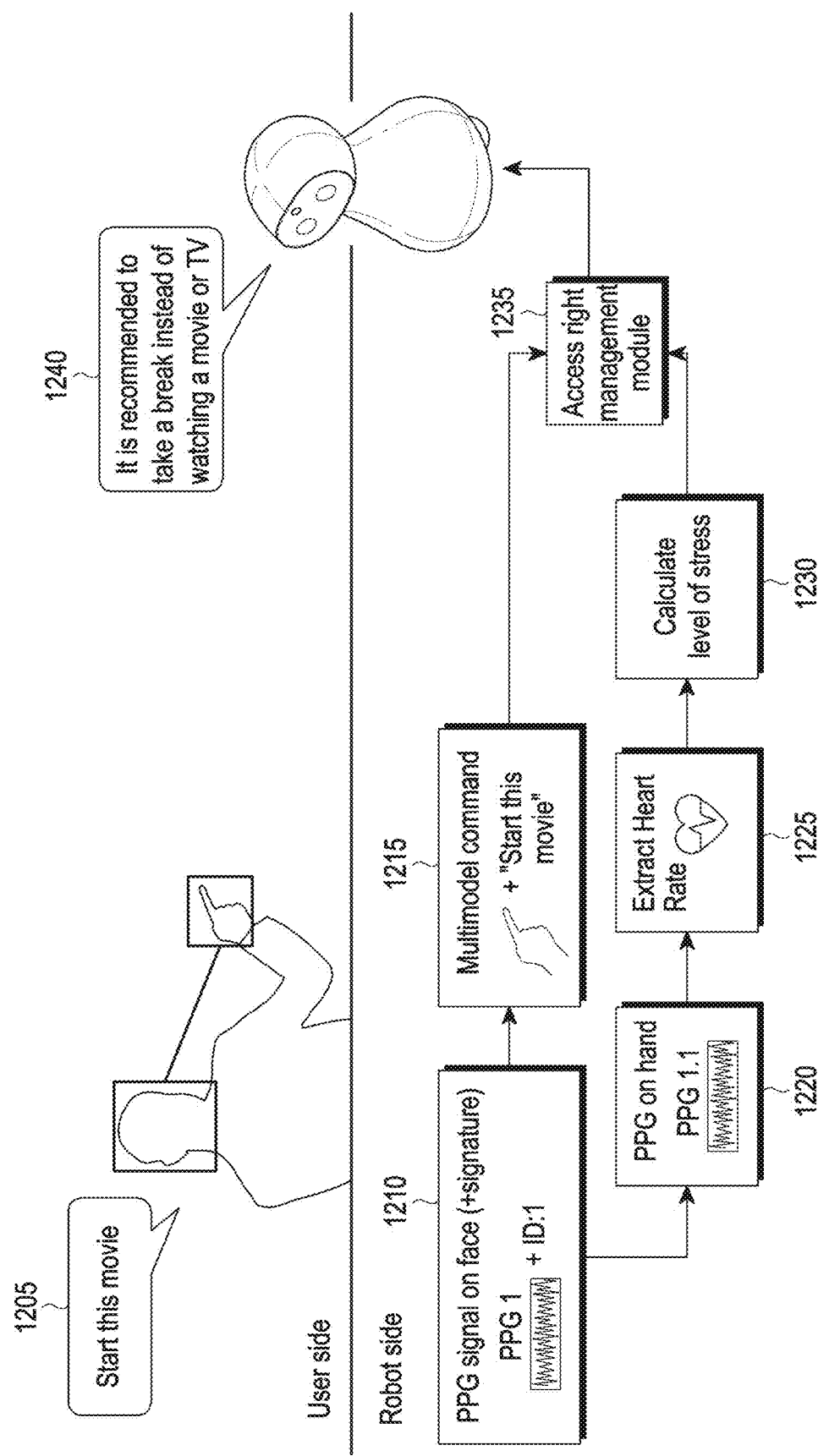
FIG. 12 is a diagram illustrating a command processing result using an additional parameter of a biosignal according to an embodiment of the disclosure.

FIG. 12 is a diagram illustrating a command processing result using an additional parameter of a biosignal according to an embodiment of the disclosure. FIG. 12 illustrates a case in which a user is photographed (or captured) using a camera while the user performs a gesture 1205.

Referring to FIG. 12, one or more image frames may be captured as the user performs the gesture 1205, and an ROI, for example, a face region and a hand region, may be extracted from the one or more image frames. After obtaining the PPG signal for the face region, the electronic device 300 may sign the obtained PPG signal with user identification information through face recognition in operation 1210. While continuously acquiring the PPG signal for the face region, the electronic device 300 may also continuously acquire the PPG signal for the hand region matching the face region in operation 1220.

According to various embodiments of the disclosure, the electronic device 300 may analyze the PPG signals while acquiring the PPG signals for the hand region. For example, the electronic device 300 may analyze the acquired PPG signals and may provide at least one piece of biometric information, such as heart rate extraction 1225 and stress level calculation 1230. The at least one piece of biometric information may include at least one of a heart rate, a stress level, and oxygen saturation. Accordingly, as a result of analyzing the PPG signal in the user's hand region, the electronic device 300 may identify a hand gesture indicated by the index finger intended for controlling the operation of the electronic device 300 (e.g., "Start this movie") in operation 1215. The multimodal commands 1215 as described above may be transmitted to the access right management module 1235.

The access right management module 1235 of the electronic device 300 may determine whether the identified user can perform a gesture or a multimodal command based on additional parameters based on the PPG signal, for example, at least one piece of biometric information. The electronic device 300 may determine that the user's stress is high based on the at least one piece of biometric information, and may execute the command by reflecting this. For example, the electronic device 300 may output a content (e.g., "It is recommended to take a break instead of watching a movie or TV") indicating the execution of a command reflecting an additional parameter with respect to the gesture 1205 by the user in operation 1240.

Figure 13:
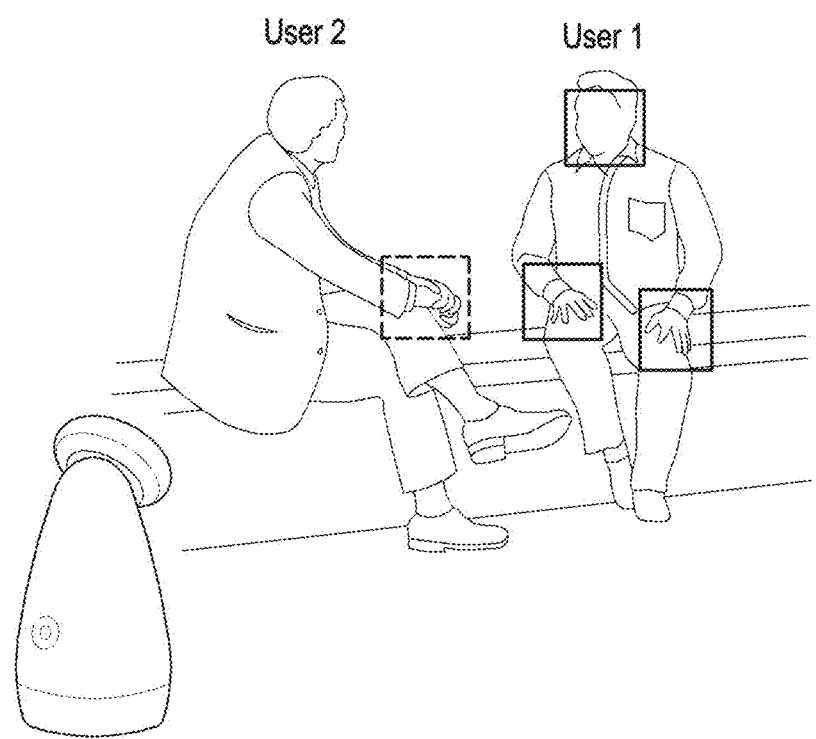
FIG. 13 is a diagram illustrating a user authentication method using at least one of biosignals related to faces and hands in an environment in which a plurality of users exist according to an embodiment of the disclosure.
Figure 14A:
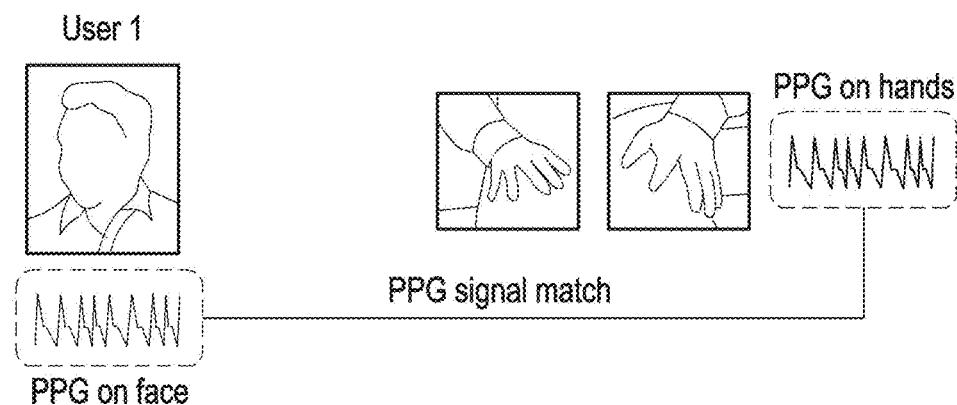
FIG. 14A is diagram illustrating a user authentication method when hand and face matching is possible and not possible in FIG. 13 according to an embodiment of the disclosure.
Figure 14B:
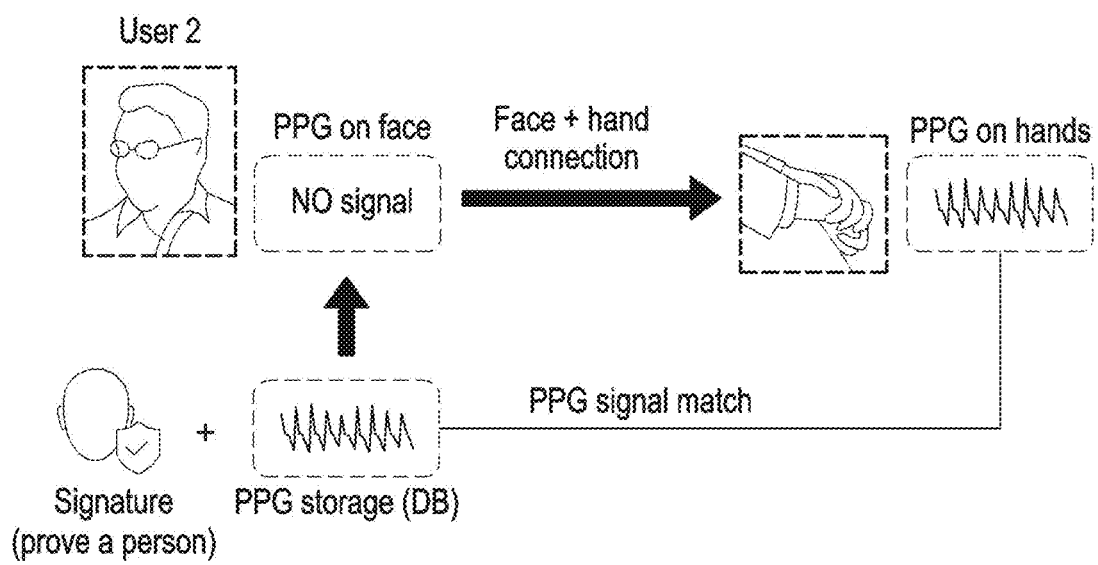
FIG. 14B is diagram illustrating a user authentication method when hand and face matching is possible and not possible in FIG. 13 according to an embodiment of the disclosure.

FIG. 13 is a diagram illustrating a user authentication method using at least one of biosignals related to faces and hands in an environment in which a plurality of users exist according to an embodiment of the disclosure. In order to describe this, reference will be made to FIGS. 14A and 14B. FIGS. 14A and 14B are diagrams illustrating a user authentication method when hand and face matching is possible and not possible in FIG. 13 according to an embodiment of the disclosure.

Referring to FIG. 13, it illustrates a case in which both a face region and a hand region are detected for user 1 and only the hand region is detected for user 2 when a plurality of users (e.g., user 1 and user 2) are captured using a camera in an environment where the plurality of users exist.

Referring to FIG. 14A illustrates a case in which both a PPG signal for a face region and a PPG signal for the hand region are available, and the electronic device 300 may match a face and hands through correlation calculation between two signals in each of the face region and the hand region. For example, by determining the hand region having a signal pattern similar to a signal pattern in the face region, it may be determined that the face and hand are for the same user.

Referring to FIG. 14B illustrates a case in which only one of the PPG signal for the face region and the PPG signal for the hand region is available. When only the PPG signal for the hand region can be obtained from the captured image, the electronic device 300 may use a database storing face-related PPG signals. The signals stored in the database may be signed with face identification (ID) data. Accordingly, when the electronic device 300 cannot obtain the PPG signal for the face region, the electronic device 300 may search the database for the PPG signal for the face region that matches the PPG signal for the hand region, and may obtain the PPG signal for the face region. The electronic device 300 may identify user 2 by using face ID data signed in the PPG signal for the face region matching the PPG signal for the hand region.

Even when the PPG signal for the face region cannot be obtained in the captured image as described above, the electronic device 300 may identify whether a corresponding user is the user having the access right for controlling the operation of the electronic device 300 only with the PPG signal for the hand region.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a camera;
memory, comprising one or more storage media, storing instructions; and
at least one processor communicatively coupled to the camera and the memory,
wherein the instructions, when executed by the at least one processor individually or collectively, cause the electronic device to:
extract a plurality of face regions and a plurality of hand regions for multiple users from an image captured by the camera,
acquire biosignals from each of the extracted plurality of face regions and plurality of hand regions,
identify each user among a plurality of users by performing face recognition for each of the plurality of face regions,
match, among the plurality of face regions and the plurality of hand regions, a pair of a face region and a hand region for each user among the plurality of users based on the acquired biosignals by:
comparing a pattern of the biosignals in the plurality of face regions with a pattern of the biosignals in the plurality of hand regions, and
matching, among the plurality of face regions and the plurality of hand regions, the pair of face region and hand region based on a comparison result, and
identify a command for controlling an operation of the electronic device based on a biosignal in the hand region matching the face region for the identified user.

2. The electronic device of claim 1, wherein the biosignals include a photo-plethysmography (PPG) signal obtained through a non-contact photoplethysmography method.

3. The electronic device of claim 2, wherein the instructions, when executed by the at least one processor individually or collectively, further cause the electronic device to acquire at least one of a heart rate and oxygen saturation based on the PPG signal.

4. The electronic device of claim 1, wherein the instructions, when executed by the at least one processor individually or collectively, further cause the electronic device to, in case that the pattern of the biosignals in the plurality of face regions and the pattern of the biosignals in the plurality of hand regions are within a threshold range, match the face region and the hand region as a pair.

5. The electronic device of claim 1, wherein the instructions, when executed by the at least one processor individually or collectively, further cause the electronic device to:
identify a user gesture in the image based on the biosignal in the hand region matching the face region for the identified user, and
identify a command for controlling an operation of the electronic device corresponding to the user gesture.

6. The electronic device of claim 1, wherein the instructions, when executed by the at least one processor individually or collectively, further cause the electronic device to identify the user by performing the face recognition and associate the user identification result with a biosignal in the face region.

7. The electronic device of claim 1, wherein the instructions, when executed by the at least one processor individually or collectively, further cause the electronic device to:
configure a region of interest (ROI) in an image captured by the camera, and
extract the plurality of face regions and plurality of hand regions within the ROI.

8. The electronic device of claim 1, wherein, in case of capturing multiple users through the camera, the instructions, when executed by the at least one processor individually or collectively, further cause the electronic device to identify a lip region within the plurality of face regions, and identify a speaking user in the image based on a biosignal in the lip region.

9. The electronic device of claim 8, wherein the instructions, when executed by the at least one processor individually or collectively, further cause the electronic device to:
identify a gesture of the speaking user in the image, and
perform an operation designated in association with the gesture of the speaking user among operations designated for each gesture.

10. A method performed by an electronic device for controlling a biosignal-based operation in, the method comprising:
extracting, by the electronic device, a plurality of face regions and a plurality of hand regions for multiple users from an image captured by a camera;
acquiring, by the electronic device, biosignals from each of the extracted plurality of face regions and plurality of hand regions;
identifying each user among a plurality of users by performing face recognition for each of the plurality of face regions;
matching, among the plurality of face regions and the plurality of hand regions by the electronic device, a pair of a face region and a hand region in for each user among the plurality of users based on the acquired biosignals by:
comparing a pattern of the biosignals in the plurality of face regions with a pattern of the biosignals in the plurality of hand regions, and
matching, among the plurality of face regions and the plurality of hand regions, the pair of face region and hand region based on a comparison result;
and
identifying, by the electronic device, a command for controlling the operation of the electronic device based on a biosignal in the hand region matching the face region of the identified user.

11. The method of claim 10, wherein the biosignals include a PPG signal obtained through a non-contact photoplethysmography method.

12. The method of claim 11, further comprising acquiring at least one of a heart rate and oxygen saturation based on the PPG signal.

13. The method of claim 10, wherein the matching of the pair of the face region and the hand region comprises matching, in case that the pattern of the biosignals in the plurality of face regions and the pattern of the biosignals in the plurality of hand regions are within a threshold range, the face region and the hand region as a pair.

14. The method of claim 10, wherein the identifying of the command for controlling the operation of the electronic device comprises:
identifying a user gesture in the image based on the biosignal in the hand region matching the face region for the identified user; and
identifying a command for controlling an operation of the electronic device corresponding to the user gesture.

15. The method of claim 10, further comprising identifying the user by performing the face recognition, and associating the user identification result with a biosignal in the face region.

16. The method of claim 10, wherein the extracting of the plurality of face regions and the plurality of hand regions comprises:
- configuring a region of interest (ROI) in an image captured by the camera; and
- extracting the plurality of face regions and plurality of hand regions within the ROI.

17. The method of claim 10, further comprising:
- identifying a lip region within the plurality of face regions;
- identifying a speaking user in the image based on a biosignal in the lip region;
- identifying a gesture of the speaking user in the image; and
- performing an operation designated in association with the gesture of the speaking user among operations designated for each gesture.

18. At least one non-transitory computer readable storage media storing one or more computer programs including computer-executable instructions that, when executed by at least one processor of an electronic device individually or collectively, perform operations, the operations comprising:
- extracting, by the electronic device, a plurality of face regions and a plurality of hand regions for multiple users from an image captured by a camera;
- acquiring, by the electronic device, biosignals from each of the extracted plurality of face regions and plurality of hand regions;
- identifying each user among a plurality of users by performing face recognition for each of the plurality of face regions;
- matching, among the plurality of face regions and the plurality of hand regions by the electronic device, a pair of a face region and a hand region for each user among the plurality of users based on using the acquired biosignals by:
- comparing a pattern of the biosignals in the plurality of face regions with a pattern of the biosignals in the plurality of hand regions, and
- matching, among the plurality of face regions and the plurality of hand regions, the pair of face region and hand region based on a comparison result;

and

- identifying, by the electronic device, a command for controlling an operation of the electronic device based on a biosignal in the hand region matching the face region of the identified user.

* * * * *